Jan. 13, 1931. E. BERGVE 1,789,212
APPARATUS FOR PRODUCING LUMINOUS PICTURES IN SPACE
Filed Dec. 18, 1928
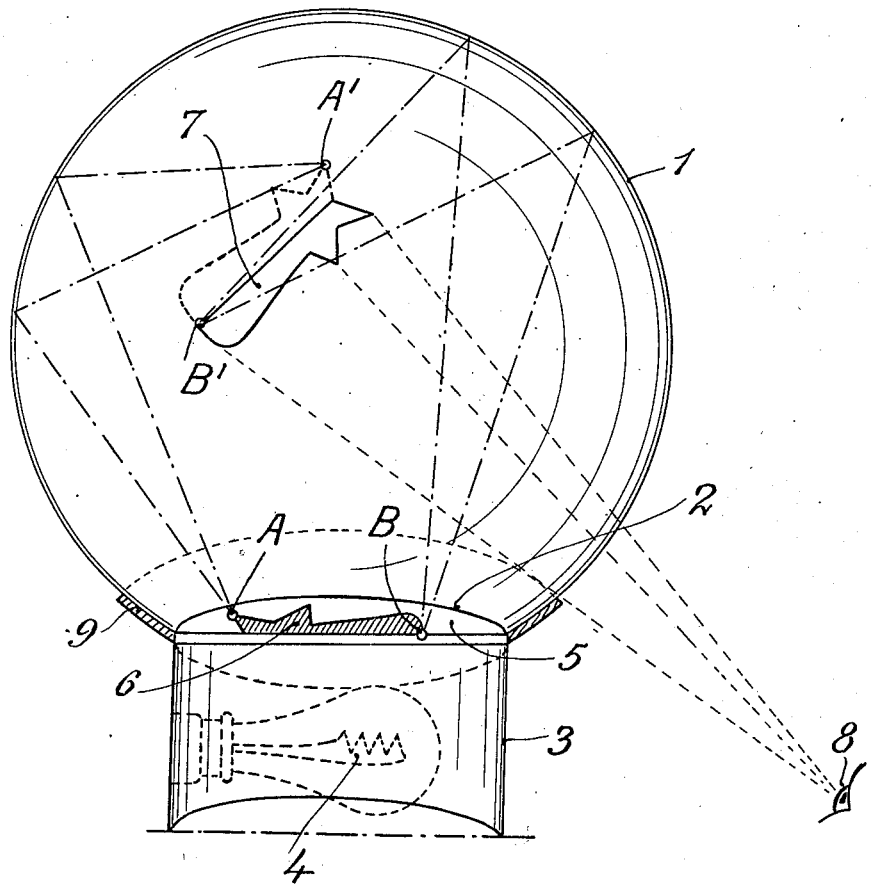

Patented Jan. 13, 1931

1,789,212

UNITED STATES PATENT OFFICE

EINAR BERGVE, OF OSLO, NORWAY

APPARATUS FOR PRODUCING LUMINOUS PICTURES IN SPACE

Application filed December 18, 1928, Serial No. 326,849, and in Germany November 22, 1928.

The present invention has for its object an apparatus for producing luminous pictures which do not appear on a picture surface, but are produced in the space within a vessel having curved reflecting walls or in the space on the concave side of a curved reflecting surface.

The apparatus according to the present invention for the production of luminous pictures of the kind referred to comprises a transparent body with curved reflecting surface against which light rays are thrown from a primary luminous body or picture. The transparent body with curved reflecting surface is preferably made in the form of a hollow vessel, the shape of whose surface is more or less approximately that of a sphere.

The hollow vessel may be evacuated or may be filled with a gas or liquid.

The primary luminous picture or body by means of which the secondary luminous picture is produced in the space within the vessel is located laterally in or near the said vessel in such a manner that it is not directly visible in order to not disturb the effect of the secondary luminous picture.

On the drawing the principle of the invention is diagrammatically illustrated by means of a vertical cross section thru an embodiment of the invention, the parts of the device which lie behind the surface of the paper being shown in perspective view.

In accordance with the embodiment illustrated the device comprises an approximately spherical hollow body 1 of glass or similar transparent material.

On one side the hollow glass vessel is provided with an approximately circular opening 2, to the edge of which is joined the cylindrical side wall 3 of a non transparent casing which serves as base for the spherical body 1. In the said casing is located a source of light, such as an electric lamp 4, and the top of the casing is formed by a translucent disk 5 on the surface of which the primary picture, such as an advertising sign 6 or the like in various colors, is located.

The disk 5 may be interchangeable in the same manner as the lantern slides of magic lanterns, or mechanically in the same manner as the films of cinematographic apparatuses, in order to change the secondary luminous picture or to produce cinematographic pictures in the space within the spherical body.

The partial reproduction of the light rays emanating from the primary luminous picture 6 upon striking the approximately spherical surface 1, has the effect of producing in the space within the spherical body a reproduction of the primary picture, and this reproduction will appear distinctly apart from the walls of the spherical body.

The secondary luminous picture produced in this manner is indicated on the drawing with 7, the part of that picture corresponding to the part of the primary picture shown on the drawing being indicated in dotted lines, as this part will be in front of the paper surface. The part of the secondary picture shown in full lines corresponds to a part of the primary picture which does not appear on the drawing.

The light rays from the different points, such as A, B of the primary picture 6 will be partially reflected as indicated by dot- and dash-lines, to the points A' B' of the secondary picture and in this manner a complete reproduction of the primary picture will be formed in the space within the spherical body so as to be visible from a point of observation 8 outside the spherical body.

In case a luminous body is substituted for the luminous picture 1, a luminous reproduction of that body will appear in the space within the hollow spherical body 1, and such bodies may be caused to perform movements within the spherical body by providing means for moving the primary luminous body.

As has been mentioned above, the primary luminous picture may be produced by means of a magic lantern or similar projecting device or by means of a cinematographic apparatus throwing pictures on a translucent picture surface located near the wall of the spherical body.

The said translucent picture surface may also be formed by a part of the wall of the spherical body itself, and the projection device may be placed at any convenient distance from the spherical body.

It is preferred to provide a non transparent collar or the like, such as 9, at the top of the base 3 in order to prevent direct light rays from the primary luminous picture to reach the observer.

Instead of locating the primary luminous picture in the manner indicated on the drawing so as to be obscured from the view of an observer by means of the non transparent box 3 and collar 9, the said picture may also be located on the opposite side of the sphere from that of the observer, in which case the same effect will be obtained.

Claims:

1. A device for obtaining luminous reproductions in space of illuminated images comprising a curved transparent reflecting surface, on the concave side of which the rays from the illuminated image are reflected so as to form an image capable of being viewed through said reflecting surface.

2. In a device for obtaining luminous reproductions in space the combination with a primary image, means for illuminating the same, and a curved transparent reflecting surface on the concave side of which the rays from the illuminated image are reflected so as to form an image capable of being viewed through said reflecting surface.

3. In a device for obtaining luminous reproductions in space the combination with a primary image, means for illuminating the same, and a hollow transparent body having a smooth, substantially spherical surface on the concave side of which the rays from the illuminated image are reflected so as to form an image capable of being viewed through said reflecting surface.

4. In a device for obtaining luminous reproductions in space the combination with a source of light, a semi-transparent picture co-operating therewith, a translucent picture surface on which the picture produced is thrown, and a hollow transparent body having a smooth substantially spherical surface, on which the light rays from the said translucent picture surface are reflected so as to form an image capable of being viewed through said reflecting surface.

5. In a device for obtaining luminous reproductions in space the combination with a projecting apparatus for producing luminous still or cinematographic pictures, a translucent picture surface on which the picture produced is thrown, and a hollow transparent body having a smooth substantially spherical surface, on which the light rays from the said translucent picture surface are reflected so as to form an image capable of being viewed through said reflecting surface.

6. In a device for obtaining luminous reproductions in space the combination with a a hollow transparent body having a smooth substantially spherical surface, a translucent picture surface located laterally with regard to said hollow transparent body so that light rays from said translucent picture surface are reflected from said spherical surface to form an image capable of being viewed through said spherical surface.

7. In a device for obtaining luminous reproductions in space the combination with a hollow transparent body having a smooth substantially spherical surface, a translucent picture surface located adjacent the side wall of said hollow transparent body so that light rays from said translucent picture surface are reflected from said spherical surface to form an image capable of being viewed through said spherical surface.

8. In a device for obtaining luminous reproductions in space the combination with a hollow transparent body having a smooth substantially spherical surface, a translucent picture surface being formed by a suitably prepared part of the wall of said hollow transparent body so that light rays from said translucent picture surface are reflected from said spherical surface to form an image capable of being viewed through said spherical surface.

In testimony whereof I affix my signature.

EINAR BERGVE.